United States Patent [19]
Kluge et al.

[11] Patent Number: 5,725,130
[45] Date of Patent: Mar. 10, 1998

[54] COMB AND DISPENSER UNIT

[75] Inventors: Kim C. Kluge, Cedarburg; Douglas W. Kluge, Milwaukee, both of Wis.

[73] Assignee: Kluge Slide Duplication, Inc., Brown Deer, Wis.

[21] Appl. No.: 522,132

[22] Filed: Aug. 31, 1995

[51] Int. Cl.$^6$ ........................................ B67D 5/06
[52] U.S. Cl. .................. 222/192; 132/112; 222/212; 222/383.1
[58] Field of Search ........................ 222/192, 211, 222/212; 132/112, 116, 148

[56] References Cited

U.S. PATENT DOCUMENTS

| | | |
|---|---|---|
| D. 135,846 | 6/1943 | Wilcox . |
| D. 205,995 | 10/1966 | Montecalvo ................ D12/4 |
| 832,864 | 10/1906 | Lockwood . |
| 1,413,320 | 4/1922 | Charles . |
| 2,164,442 | 7/1939 | Bankston . |
| 2,647,490 | 8/1953 | Twiet ........................ 119/86 |
| 2,943,602 | 7/1960 | Rundle ...................... 115/156 |
| 3,721,250 | 3/1973 | Walter et al. ............... 132/112 |
| 3,960,160 | 6/1976 | Hogan ....................... 132/112 |
| 4,090,522 | 5/1978 | Donley et al. .............. 132/112 |
| 4,938,621 | 7/1990 | Pyrozyk ................... 132/112 X |
| 4,958,596 | 9/1990 | Belan ......................... 119/86 |
| 4,977,909 | 12/1990 | Chou ......................... 132/123 |
| 4,995,344 | 2/1991 | Olson ......................... 119/85 |
| 5,056,480 | 10/1991 | Murray, Sr. .............. 222/192 X |
| 5,152,305 | 10/1992 | Niv ............................ 132/112 |
| 5,193,557 | 3/1993 | Hogan ....................... 132/112 |
| 5,303,851 | 4/1994 | Libit et al. .............. 222/211 X |
| 5,388,728 | 2/1995 | Gueret .................... 222/192 X |

*Primary Examiner*—Joseph Kaufman
*Attorney, Agent, or Firm*—Reinhart, Boerner, Van Deuren, Norris & Rieselbach s.c.

[57] ABSTRACT

A comb and dispenser unit for grooming hair or fur. The unit includes a reservoir having an outwardly flared base with a flat bottom surface upon which the reservoir can be stably stored. A handle portion is coupled to the reservoir and includes a pliable pump actuator in communication with the reservoir and a nozzle. A comb is coupled to the handle portion and has comb teeth extending away from the handle portion in planes substantially parallel to a plane defined by preferred actuation of the pump actuator. A nozzle is contained in a nozzle portion coupled to the comb portion for spraying a fluid pumped from the reservoir into the hair or fur being groomed. The nozzle sprays fluid above the engagement points of the comb teeth and the hair or fur.

16 Claims, 3 Drawing Sheets

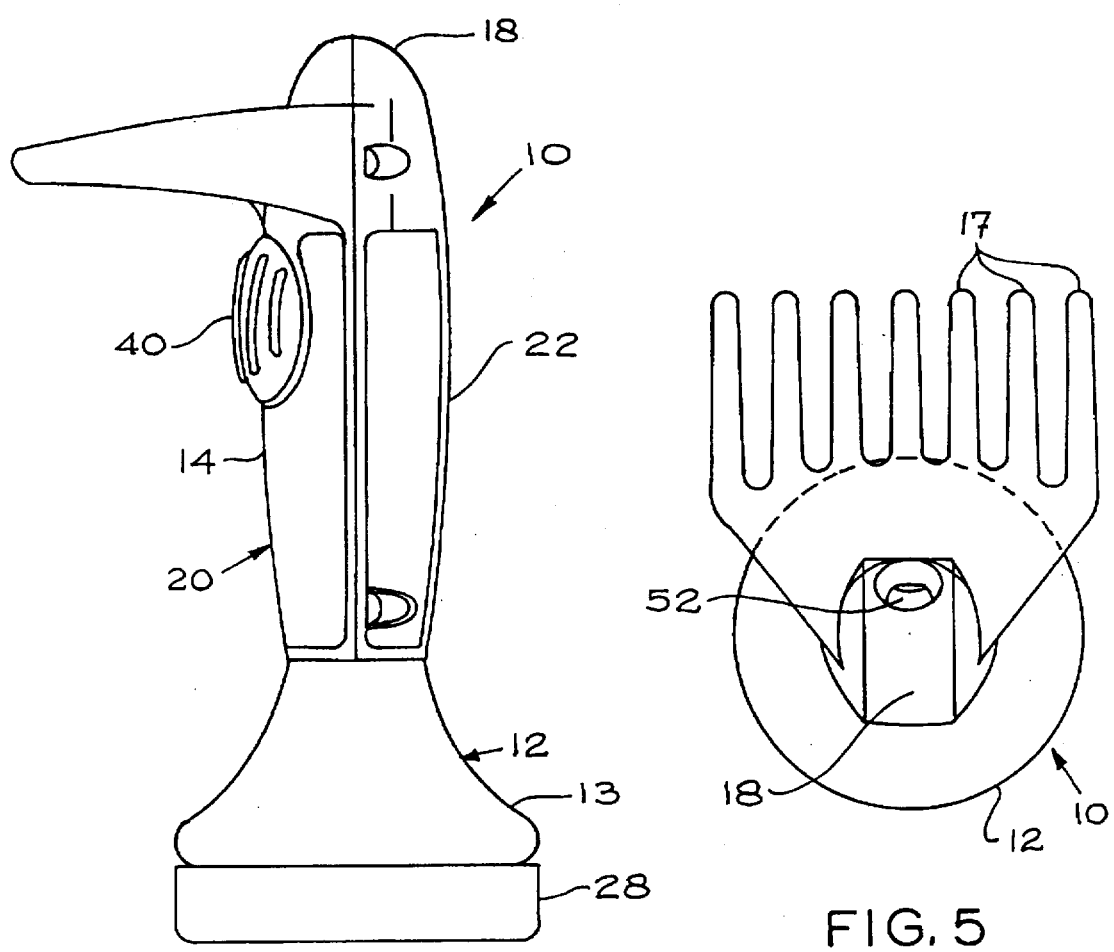

COMB AND DISPENSER UNIT

BACKGROUND OF THE INVENTION

The present invention generally relates to a comb and dispenser unit. More particularly, the present invention relates to a comb and dispenser unit for applying fluid and detangling hair or fur.

Grooming animals has traditionally been a time consuming task that has commonly been perceived as a necessary chore rather than a source of pleasure. Recently, studies have indicated that pet ownership has certain therapeutic effects including lowering a pet owner's blood pressure. However, certain pets such as horses and densely furred animals have substantial grooming needs that can detract from the pleasure of possible therapeutic effects of pet ownership. Further, leisure time for most pet owners has diminished in recent years due to work-related demands and the like.

It is therefore an object of the invention provide an improved grooming apparatus and method that decreases time needed for such grooming.

It is another object of the invention to provide a novel apparatus and method for expediting detangling of animal hair or fur.

It is a further object of the invention to provide an improved apparatus and method for applying a fluid to hair or fur for improved detangling.

It is yet another object of the invention to provide a novel ergonomically-designed apparatus and method for grooming animals.

Other objects, features and advantages of the present invention will be apparent from the following description of the preferred embodiments thereof, taken in conjunction with the accompanying drawings described below wherein like components have like numerals throughout the several views.

BRIEF DESCRIPTION OF THE DRAWINGS

FIG. 4 is a side view of the comb and dispenser unit shown in FIGS. 1–3; and

FIG. 5 is a top view of the comb and dispenser unit shown in FIGS. 1–4.

DETAILED DESCRIPTION OF PREFERRED EMBODIMENTS

Figure 1:
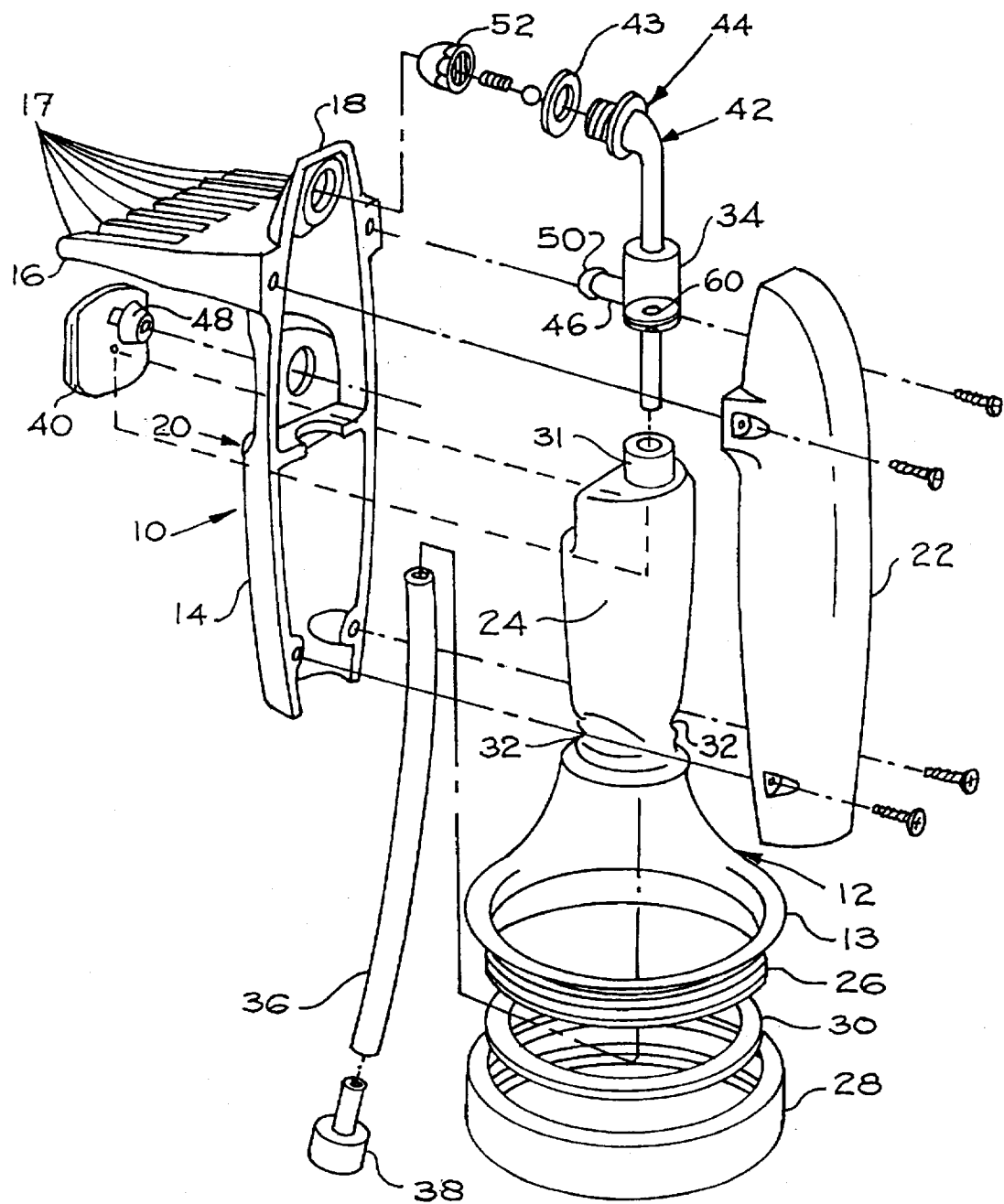
FIG. 1 is an exploded isometric view of a comb and dispenser unit constructed in accordance with one preferred form of the invention.

Referring to the Figures and more particularly to FIG. 1, a comb and dispenser unit 10 preferably includes a reservoir 12, a handle portion 14, a comb portion 16 including comb teeth 17, and a nozzle portion 18. While the portions 12, 14, 16 and 18 can be molded separately in multiple pieces, preferably the handle portion 14, comb portion 16 and nozzle portion 18 form an integral piece 20 connected to a back plate 22 as shown in FIG. 1. The integral piece 20 and the back plate 22 define a cavity therebetween for engaging an upper portion 24 of the reservoir 12.

Figure 2:
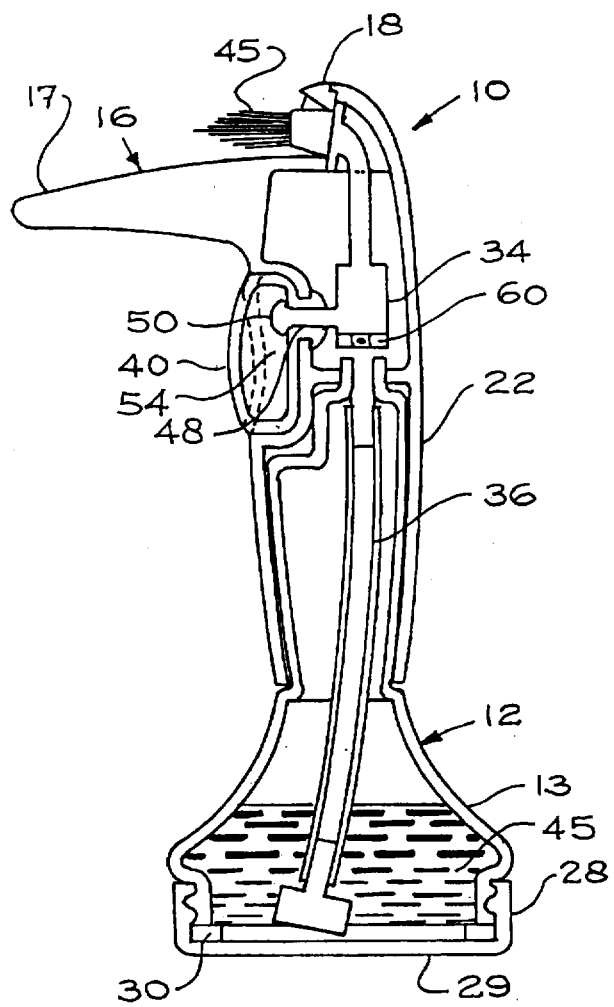
FIG. 2 is a side cross-sectional view of the comb and dispenser unit of FIG. 1 in an upright position.

The handle portion 14 is generally elliptically shaped and includes a pump actuator 40 disposed therein as shown in FIGS. 1, 2 and 4. The pump actuator 40 is in fluid communication with the reservoir 12 and a nozzle 44 disposed in the nozzle portion 18. The nozzle 44 is aimed to spray a fluid 45 pumped from the interior of reservoir 12 into material to be combed at points above and at engagement of the comb teeth 17 in the material to be combed as shown in FIG. 2. The fluid 45 can comprise a wide variety of conventional fluids, including oils, gloss agents and conditioners, though preferably the fluid 45 includes baby oil or its equivalent.

The reservoir 12 preferably includes an outwardly flared base 13 which, in conjunction with the comb portion 16, prevents a user's hand from slipping off ends of the handle portion 14. The base 13 terminates in a threaded portion 26 for threaded engagement with a lid 28. The lid 28 preferably has a generally flat bottom surface 29 upon which the reservoir 12 can be rested stably. Alternatively, the lid 28 can be shaped to engage a special holder, a fence post or can take a variety of shapes. A gasket 30 can be provided for sealing the fluid 45 in the reservoir 12, although the gasket 30 may not be needed when certain conventional plastic materials are used for the reservoir 12 and lid 28. The reservoir 12 further includes a notched section 32 for engaging four tabs on the integral piece 20 and the back plate 22. This engagement securely holds the reservoir 12 between the integral piece 20 and the back plate 22.

The reservoir 12 also includes a top 31 engageable with a fluid line 34 as shown in FIGS. 1 and 2. While a variety of conventional mounting configurations can be used, preferably the fluid line 34 is inserted in frictional engagement with the reservoir 12 at the top 31 of the reservoir 12. The fluid line 34 conventionally engages a fill hose 36 which can be conventionally attached to a strainer 38. The strainer 38 prevents large pieces of foreign material from entering the fill hose 36. The length of the fill hose 36 is selected to enable virtually all of the fluid 45 to be pumped from the reservoir 12. The fluid line 34 further includes a pump actuator line 46 with a flared surface 50. The flared surface 50 engages a complementary surface 48 on the pump actuator 40 as shown in FIGS. 1 and 2. This complementary engagement securely holds the pump actuator 40 in place in the handle portion 14.

The fluid line 34 further comprises a nozzle line 42 which is coupled to the nozzle 44 when the unit 10 is assembled. The nozzle includes a nozzle cap 52, and other conventional sprayer components well known in the art. The nozzle cap 52 is threadably engaged with the nozzle 44 after the nozzle 44 is threaded through the nozzle portion 18 of the integral piece 20. A nozzle gasket 43 can be used for additional sealing if needed.

The pump actuator 40 preferably comprises a pliable material such as rubber which is fluid tight and defines a pumping volume 54 therein. The pliable characteristic of the pump actuator material enables volume to change in the pump actuator 40 for pumping purposes, and also enables interlocking engagement of the complementary surface 48 with the pump actuator line 46. The pump actuator 40 can be depressed by the user in a variety of ways. Preferably, however, the pump actuator 40 is depressed along an actuation plane 56 defined by the center of the pump actuator 40 and a longitudinal axis of the unit 10. It will be apparent that a conventional actuator can be used with modifications to lines carrying the fluid 45. The conventional actuator must be depressed along a single axis in the actuation plane 56.

When the pump actuator 40 is actuated by the user depressing the pump actuator 40 as shown in phantom in FIG. 2, the fluid 45 is drawn upward into the fill hose 36 toward the fluid line 34. Continued actuation forces the fluid 45 past a conventional check valve 60 in the fluid line 34 and upward and out the nozzle 44. The fluid 45 is sprayed at points above the engagement of the comb teeth 17 with the material to be combed as well as at such engagement. Accordingly, at least part of the fluid 45 is sprayed at the areas of least density of the material to be combed. This enhances penetration of the fluid 45, thereby increasing the detangling effectiveness of the fluid 45. The width of the spray pattern of the fluid 45 is preferably limited to spray no wider than the outside comb teeth 17.

Figure 3:
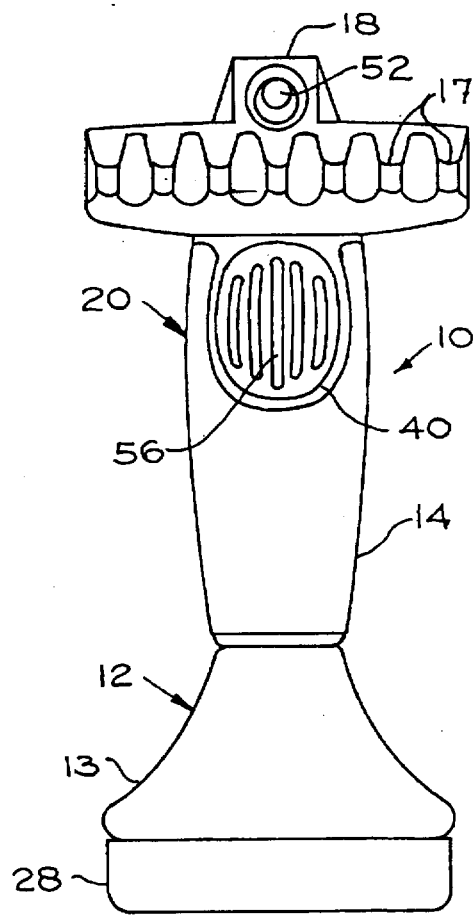
FIG. 3 is a front view of the comb and dispenser unit shown in FIGS. 1–2.

The comb portion 16 includes a plurality of solid comb teeth 17 extending outwardly from the handle portion 14 along planes substantially parallel to the actuation plane 56. While the number of comb teeth 17 can be varied, preferably the comb teeth 17 are about one-quarter inch wide and are spaced about one-quarter inch apart as shown in FIGS. 3 and 5. This density of comb teeth 17 enables engagement of a suitable amount of material to be combed for effective detangling. The comb teeth 17 are tapered from top to bottom and side to side. This tapering is best shown in FIGS. 2, 3 and 5 and further provides efficient detangling of the material to be combed. Additionally, the present invention greatly reduces damage to the material to be combed, which is unsightly and can lead to points reduction by judges at pet shows. The comb teeth 17 preferably are mounted at an approximately 90° degree angle to the handle portion 14. The comb teeth 17 preferably curve away from the nozzle portion 18 as best shown in FIGS. 1, 2 and 4.

One preferred method of using the invention relates to using the unit 10 to groom a horse's tail. For this task, the reservoir 12 preferably is filled with a conditioner type of fluid 45 by pouring the fluid 45 from a bottle into the bottom of the reservoir 12 with the lid 28 removed. The lid 28 is replaced after filling the reservoir 12. The comb teeth 17 are engaged with the horse's tail for detangling. The unit 10 can be used in an upright or inverted position because the pump actuator 40 can be comfortably actuated in either position and because the comb teeth 17 are tapered adjacent top and bottom portions thereof.

The unit 10 effectively detangles normally tangled portions of a horse's tail in the upright position. Actuating the pump actuator 40 sprays fluid 45 into the combed material. For particularly tangled portions of the tail, the unit 10 can be inverted so that the fluid 45 can be sprayed ahead of the comb teeth 17 engagement with the hair. The pump actuator 40 can be comfortably actuated by one or more of the user's fingers or one of the user's thumbs. This feature enables the unit 10 to be reversed in either an upright or inverted position to effectively groom the portion of the horse's tail opposite the user. In this configuration, the ends of comb teeth 17 point toward the user and the unique design of the pump actuator 40 enables repeated actuation to be accomplished comfortably and easily even when the unit 10 is obscured from view by the horse's tail.

While preferred embodiments of the invention have been shown and described, it will be clear to those skilled in the art that various changes and modifications can be made without departing from the invention in its broader aspects as set forth in the claims provided hereinafter.

We claim:

1. A comb and dispenser unit, comprising:

a reservoir having a base with a substantially flat bottom surface upon which said reservoir can be stably stored;

a handle portion coupled to said reservoir and including a pump actuator in fluid communication with said reservoir and a nozzle;

a comb portion coupled to said handle portion and having comb teeth arranged substantially in a row and extending away from said handle portion and perpendicular to a longitudinal axis of said unit in extension planes substantially parallel to a preferred actuation plane of the pump actuator whereby a combing function is performed by moving said unit substantially along a combing axis generally parallel to said longitudinal axis; and a nozzle portion including said nozzle and coupled to said comb portion for spraying a fluid pumped from said reservoir into material to be combed at points above engagement of said comb teeth and the material to be combed.

2. The comb and dispenser unit as defined in claim 1, wherein said nozzle can also spray the fluid at points located at the engagement of said comb teeth and the material to be combed.

3. The comb and dispenser unit as defined in claim 1, wherein said reservoir is provided with a removable lid which includes said substantially flat bottom surface.

4. The comb and dispenser unit as defined in claim 1, wherein at least portions of said comb portion, said handle portion and said nozzle portion are an integral unit.

5. The comb and dispenser unit as defined in claim 1, wherein said base flares outwardly.

6. The comb and dispenser unit as defined in claim 1, wherein said pump actuator comprises rubber substantially enclosing a pumping volume.

7. A comb and dispenser unit, comprising:

a reservoir having an outwardly flared base terminating in a threaded portion for threaded engagement with a lid having a substantially flat bottom surface upon which said reservoir can be stably stored;

an integral handle portion, comb portion and nozzle portion, said integral portions being removably connected to a back plate, said integral portions and said back plate defining a cavity there between for engaging an upper portion of said reservoir;

said handle portion including a rubber pump actuator substantially enclosing a pumping volume in fluid communication with said reservoir and a nozzle disposed in said nozzle portion;

said comb portion having solid comb teeth arranged substantially in a row and extending away from said handle portion and perpendicular to a longitudinal axis of said unit in extension planes substantially parallel to a preferred actuation plane of the pump actuator whereby a combing function is performed by moving said unit substantially along a combing axis generally parallel to said longitudinal axis, said teeth being tapered in the extension planes and planes perpendicular to the extension planes; and said nozzle portion including said nozzle for spraying a fluid pumped from said reservoir into material to be combed at points above and at engagement of said comb teeth and the material to be combed.

8. The comb and dispenser unit as defined in claim 7, wherein said reservoir includes a notched section for engagement with said handle portion and said back plate.

9. The comb and dispenser unit as defined in claim 7, wherein said pump actuator is in interlocking engagement with a complementary surface of a line in fluid communication with said nozzle.

10. The comb and dispenser unit as defined in claim 7, wherein said base flares outwardly.

11. A comb and dispenser unit, comprising:

a reservoir having an outwardly flared base abutting a handle portion coupled to said reservoir, said handle portion having a substantially elliptical shape and including a pump actuator in fluid communication with said reservoir and a nozzle;

a comb portion connected to said handle portion and having comb teeth arranged substantially in a row, said row extending away from said handle portion and perpendicular to a longitudinal axis of said unit planes substantially parallel to a preferred actuation plane of the pump actuator whereby a combing function is performed by moving said unit substantially along a combing axis generally parallel to said longitudinal axis; and a nozzle portion including said nozzle and coupled to said comb portion for spraying a fluid pumped from said reservoir into material to be combed at points above engagement of said comb teeth and the material to be combed.

12. The comb and dispenser unit as defined in claim 11, wherein said nozzle can also spray the fluid at points located at the engagement of said comb teeth and the material to be combed.

13. The comb and dispenser unit as defined in claim 11, wherein said reservoir is provided with a removable lid which includes said substantially flat bottom surface.

14. The comb and dispenser unit as defined in claim 11, wherein at least portions of said comb portion, said handle portion and said nozzle portion are an integral unit.

15. The comb and dispenser unit as defined in claim 11, wherein said base flares outwardly to a diameter larger than a largest diameter of said handle.

16. The comb and dispenser unit as defined in claim 11, wherein said pump actuator comprises rubber substantially enclosing a pumping volume.

\* \* \* \* \*